United States Patent [19]

Mittmann

[11] Patent Number: 4,519,772
[45] Date of Patent: May 28, 1985

[54] HEATING DEVICE FED WITH FREE-FLOWING FUEL

[75] Inventor: Bernd Mittmann, Munich, Fed. Rep. of Germany

[73] Assignee: Webasto-Werk. W. Baier GmbH & Co., Fed. Rep. of Germany

[21] Appl. No.: 537,540

[22] Filed: Sep. 30, 1983

[30] Foreign Application Priority Data

Dec. 28, 1982 [DE] Fed. Rep. of Germany ....... 3248412

[51] Int. Cl.$^3$ ................................. F23Q 9/08
[52] U.S. Cl. ..................................... 431/45; 237/2 A; 237/12.3 C
[58] Field of Search .......................... 237/2 A, 12.3 C; 126/110 B; 431/45, 43

[56] References Cited

U.S. PATENT DOCUMENTS 4,411,385  10/1983  Lamkewitz .......................... 237/2 A

FOREIGN PATENT DOCUMENTS 1125790  4/1962  Fed. Rep. of Germany ..... 237/12.3 C
1124377  8/1962  Fed. Rep. of Germany ..... 237/12.3 C
1143725  8/1963  Fed. Rep. of Germany ..... 237/12.3 C Primary Examiner—Henry Bennett
Attorney, Agent, or Firm—Sixbey, Friedman & Leedom

[57] ABSTRACT

A heating device fed with free-flowing fuel and connected to an on-board voltage source, in particular, a vehicle heater. The heating device is equipped with a burner assembly which has a fuel supply, a combustion air fan and a heating element which ignites a fuel/air mixture after a preheating phase. During the preheating phase, the combustion fuel fan is shut off or at least is operated at less than the operating blower output. There is also a switching device which automatically turns on or switches the combustion air fan to its operating blower output after a preheating phase has been completed. The switching device is designed as a voltage-dependent time-function element, which presets a preheating time dependent upon the magnitude of the on-board voltage and which decreases the preheating time as the on-board voltage increases.

2 Claims, 4 Drawing Figures

HEATING DEVICE FED WITH FREE-FLOWING FUEL

BACKGROUND AND SUMMARY OF THE INVENTION

The invention concerns a heating device fed with free-flowing fuel and connected to an on-board voltage source, in particular, a vehicle heating device with a burner assembly which includes a fuel supply, a combustion air fan and a heating element which ignites a fuel/air mixture after a preheating phase, during which the combustion air fan is switched off or operated at less than the operating blower output, as well as a switching device which automatically turns on or switches the combustion air fan to its operating blower output following completion of the preheating phase. Heating devices of this type are already known (DE-PS Nos. 11 24 377, 11 25 790, and 11 43 725). The duration of the preheating phase in these devices is set. Satisfactory ignition has proven to be problematic in such equipment when the on-board voltage changes. In the case of undervoltage, the temperature on the glowing surface of the heating element, in particular, a glow plug, can be so low that ignition of the fuel/air mixture is no longer guaranteed. Should an overvoltage occur, the heating element, e.g., its heating coil, could burn out.

The invention, thus, has for a principal object the creation of a heating device which produces safe ignition, even when on-board voltage varies, and in which the heating element is simultaneously protected in a simple manner against damage by overvoltage.

This object is achieved, in accordance with a preferred embodiment of the invention, by providing a device of the type mentioned initially with a switching device that is designed as a voltage-dependent time function element, which presets a preheating time that is adjusted based on the magnitude of the on-board voltage.

The invention is based on the fact that the temperature of the heating element is a function of time, i.e., because of the temperature dependence in the heating device, a period of time, which will increase or decrease depending upon the actual voltage, will pass before a predetermined operating temperature is reached. By adjusting the preheating time, the temperature of the heating element can consequently be limited to a value which will prevent overheating of the heating element, even when the heating element is selected in such a way that it ensures that a required ignition temperature is achieved, even at the lower end of the expected on-board voltage range.

In accordance with a further aspect of the invention, the voltage/time performance line of the time-function element is, preferably, adapted to the system of voltage-dependent temperature heating time performance lines of the heating device in such a manner that the temperature reached by the heating device within the given preheating time approximates the maximum allowable temperature of the coil, but does not exceed this temperature. This guarantees a particularly high certainty of ignition being obtained.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
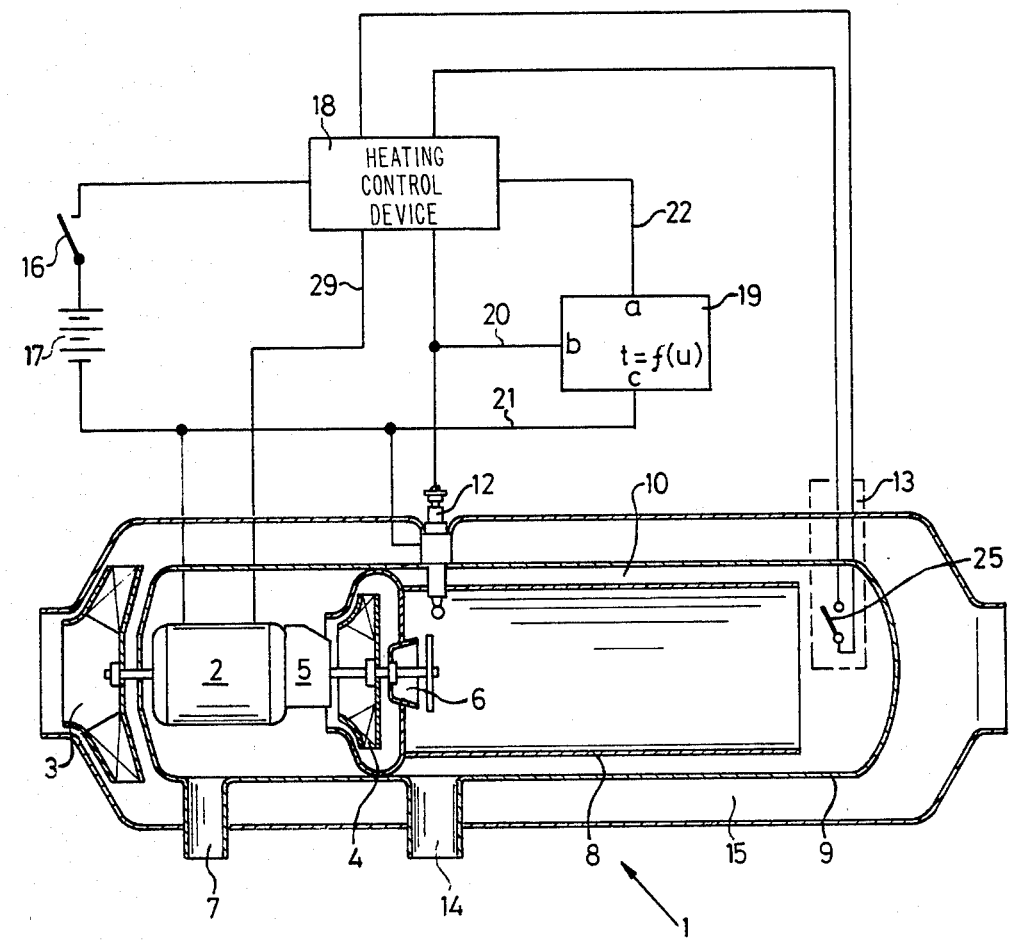
FIG. 1 is a schematic diagram of a heating device in accordance with the invention.

The heating device illustrated in FIG. 1, which can, in particular, be a vehicle heater, has a burner assembly 1 with an electric motor 2. Electric motor 2 drives the heating air fan 3, a combustion air fan 4, a fuel pump 5 and a rotating atomizer 6. Combustion air is suctioned in through a suction opening 7 and, along with the fuel sprayed by rotating atomizer 6, is transferred to a combustion chamber tube 8. Combustion chamber tube 8, along with a pot 9, defines an exhaust channel 10, into which an exhaust opening 14 opens. A heating element, such as glow plug 12, is provided to ignite the fuel/air mixture. The establishment of a flame in the burner assembly 1 is monitored by combustion monitor 13, which has a contact 25. The heat produced during operation of the heating device is given off to the heating air conveyed by heating air fan 3 in a heating air channel 15.

After start switch 16 closes, electric motor 2 and glow plug 12 are fed from battery 17, which constitutes an on-board voltage source, via heating control device 18 which is shown schematically as a block.

The arrangement described to this point is known.

In addition to the above, there is a voltage-dependent time-function element 19 which sends a signal to its output a after a delay period when voltage is applied to its inputs b and c; the length of the delay time is dependent upon the magnitude of the voltage at inputs b, c. According to FIG. 1, inputs b, c of time-function element 19 are connected to the voltage supply terminals of glow plug 12 via lines 20, 21, so that the voltage supplied to inputs b, c is equal to the voltage at glow plug 12. Output a of time-function element 19 is connected to heating control device 18 via a line 22.

The heating device operates as follows: the start switch 16 is closed to begin operation. The heating control device 18 sends voltage to glow plug 12. The glow plug heats in accordance with the temperature/heating time performance line. This performance line is dependent upon the magnitude of voltage provided by battery 17. Three such performance lines 26, 27, 28 are shown in FIG. 3 for three different on-board voltages $U_1$, $U_2$, $U_3$, which are equal to, for example, 10 V, 12 V, and 14 V, respectively. The temperature of the coil of glow plug 12 increases over time in accordance with the corresponding performance line. At the same time as the on-board voltage is applied to glow plug 12, this voltage also appears at inputs b, c of time-function element 19. Time-function element 19 is started. After a preheating time, which is dependent upon the magnitude of the on-board voltage, time-function element 19 sends a signal to heating control device 18 via its output a and line 22; this causes heating control device 18 to switch on electric motor 2 via a line 29. The relationship between the voltage at glow plug 12 and preheating time T is predetermined by time-function element 19, i.e., the time which passes between the connection of voltage to time-function element inputs b, c and activation of electric motor 2 due to the signal received via line 22. This predetermined relationship can be seen in FIG. 2, which, as an example, illustrates a corresponding voltage/time performance line 30 of time-function element 19.

Figure 2:
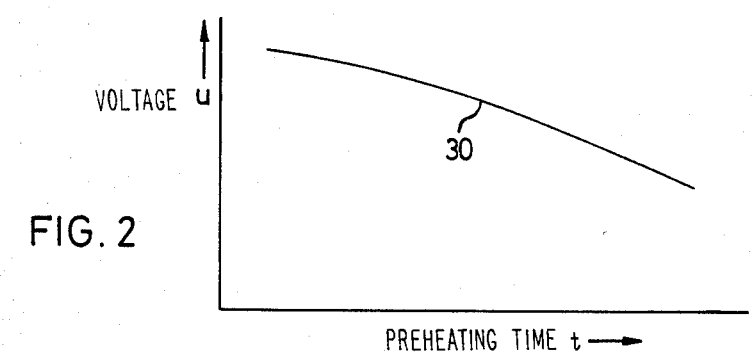
FIG. 2 is an illustration of the voltage/time performance line of the time-function element of the heating element in the heating device according to FIG. 1.
Figure 3:
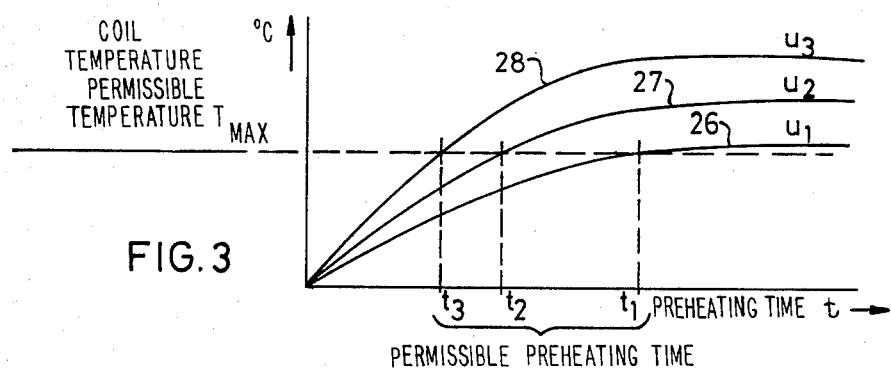
FIG. 3 is an illustration of the family of voltage-dependent temperature/heating time performance lines of the glow plug of the heating device according to FIG. 1.

The performance line $u = f(t)$, according to FIG. 2, was selected on the basis of the temperature-heating time performance lines (e.g., performance lines 26, 27, 28 in FIG. 3), in such a manner that the maximum permissible temperature $T_{max}$ of the coil of glow plug 12 will not be exceeded at the predetermined voltage-dependent preheating time set by time-function element 19. A maximum permissible preheating time $t_1$, $t_2$ or $t_3$, according to FIG. 3, is, thus, associated with each on-board voltage value; the same, naturally, applies accordingly to intermediate values. It is preferable for performance line 30, which reflects the dependency of the preheating time upon the glow plug voltage, to be adapted to the performance lines, e.g., performance lines 26, 27, 28 of glow plug 12, in such a manner that the glow plug can reach or approximate, but not exceed, the maximum permissible temperature $T_{max}$ within the preheating time set by time-function element 19. When electric motor 2 is switched on after the on-board voltage-dependent preheating time has passed, fuel pump 5 and the combustion air fan 4 begin to transport fuel and combustion air, respectively. The fuel/air mixture formed by atomizer 6 is reliably ignited by the glow plug, which has essentially been heated to temperature $T_{max}$. Thereafter, if desired, glow plug 12 can be shut off when combustion monitor 13 responds. However, since the heater coil is cooled by the combustion air flow produced by combustion air fan 4, heating control device 18 can also be designed so that glow plug 12 is left on, or operates as in U.S. Pat. No. 4,350,288.

Should immediate ignition fail to occur for other reasons and in spite of a sufficient plug temperature, thus requiring double or triple preheating periods, time-function element 19 and/or heating control device 18 should be designed such that a cooling phase of sufficient duration follows each heating process before voltage is again applied to glow plug 12. Otherwise, temperature $T_{max}$ could be exceeded.

Although it was assumed, in the explanation of FIG. 1, that electric motor 2 is dead in the preheating phase, it is also possible, in accordance with a modified design, for the combustion air fan to be operated at a reduced rpm during preheating; the combustion air fan can then be switched to its operating blower output using the signal from time-function element 19.

Figure 4:
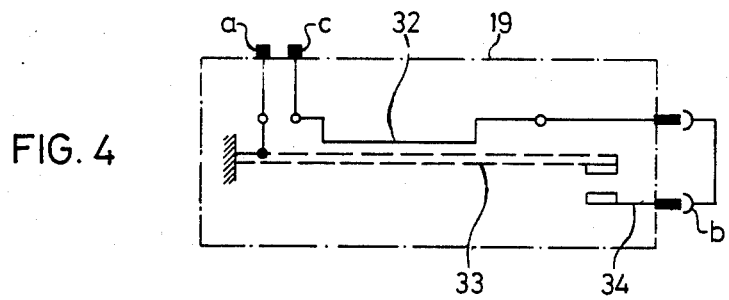
FIG. 4 is an illustration of a practical example of the voltage-dependent time-function element of the heating device according to FIG. 1.

FIG. 4 shows a simple electromechanical design of a time-function element 19. Time-function element 19 is formed by a thermo-relay which has a heating coil 32 and a thermo-relay contact 33. When started, voltage is applied to heating coil 32 via the inputs b, c. The heating coil temperature increases more or less rapidly, depending upon the magnitude of voltage applied. Once the switching temperature is reached, relay contact 33 makes contact with a stationary contact 34, sending a voltage signal from input b to output a via contacts 33, 34; according to FIG. 1, this voltage signal travels via line 22 to heating control device 18.

It is understood here that voltage-dependent time-function elements other than the electromechanical time-function element 19, shown in FIG. 4, may also be used; in particular, electronic time-function elements of known design may also be used.

While I have shown and described a single embodiment in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. In a heating device of the type fed with free-flowing fuel and connected to an on-board voltage source, in particular, a vehicle heating device with a burner assembly which includes a fuel supply, a combustion air fan and a heating element to ignite the fuel/air mixture after a preheating phase, during which at least the combustion air fan is shut off or is operated at less than the operating blower output, and with a switching device which automatically turns on or switches the combustion air fan to its operating blower output following completion of the preheating phase, the improvement wherein the switching device comprises a voltage-dependent, time-function element which presets a preheating time for the heating element based on the magnitude of on-board voltage applied thereto, and being operable to decrease preheating duration as the on-board voltage increases.

2. Heating device according to claim 1, wherein a voltage/time performance line of the time-function element is set in accordance with a system of voltage-dependent, temperature/heating time performance lines of the heating element in such a manner that the temperature reached by the heating device within the preheating time approximates an allowable maximum temperature, but does not exceed same.

* * * * *